United States Patent
Moore (10) Patent No.: US 9,695,648 B2
(45) Date of Patent: Jul. 4, 2017

(54) 4-ROUND THREAD FORM (71) Applicant: FUTURE PIPE INDUSTRIES GROUP LIMITED, Dubai (AE)

(72) Inventor: Lawrence Moore, Houston, TX (US)

(73) Assignee: FUTURE PIPE INDUSTRIES GROUP LIMITED, Dubai (AE)

( * ) Notice: Subject to any disclaimer, the term of this patent is extended or adjusted under 35 U.S.C. 154(b) by 127 days.

(21) Appl. No.: 14/448,306

(22) Filed: Jul. 31, 2014

(65) Prior Publication Data
US 2015/0035273 A1 Feb. 5, 2015

Related U.S. Application Data

(60) Provisional application No. 61/860,714, filed on Jul. 31, 2013.

(51) Int. Cl.
*F16L 15/00* (2006.01)
*E21B 17/042* (2006.01)
*F16B 33/02* (2006.01)

(52) U.S. Cl.
CPC .......... *E21B 17/042* (2013.01); *F16L 15/001* (2013.01); *F16B 33/02* (2013.01)

(58) Field of Classification Search
USPC ....................................... 285/390, 333, 334
See application file for complete search history.

(56) References Cited

U.S. PATENT DOCUMENTS

| | | | | |
|---|---|---|---|---|
| 3,508,771 A | * | 4/1970 | Duret ................... | E21B 17/042 285/334 |
| 4,295,751 A | * | 10/1981 | Holmberg ........... | E21B 17/0426 285/334 |
| 4,799,844 A | * | 1/1989 | Chuang ............... | E21B 17/0426 285/334 |
| 4,943,094 A | * | 7/1990 | Simmons .............. | E21B 17/042 285/333 |
| 5,056,611 A | * | 10/1991 | Yousef ................... | F16B 33/02 175/415 |
| 5,060,740 A | * | 10/1991 | Yousef ................ | E21B 17/0426 175/415 |
| 5,127,784 A | * | 7/1992 | Eslinger ................ | F16L 15/006 285/334 |
| 5,163,523 A | * | 11/1992 | Yousef ................... | F16B 33/02 175/320 |
| 5,931,511 A | * | 8/1999 | DeLange .............. | E21B 17/042 285/333 |
| 6,056,324 A | * | 5/2000 | Reimert ................ | E21B 17/042 285/18 |
| 7,654,316 B2 | * | 2/2010 | Telfer ................... | E21B 17/042 166/242.6 |
| 2002/0113436 A1 | * | 8/2002 | Verdillon .............. | F16L 15/004 285/333 |

(Continued)

*Primary Examiner* — Aaron Dunwoody
(74) *Attorney, Agent, or Firm* — Nath, Goldberg & Meyer; Jerald L. Meyer; Christopher Thomas (57) ABSTRACT

An apparatus is disclosed that forms a piping thread form of four threads per inch pipe (TPI). The thread form is configured to have a load flank, a load flank angle, a stab flank, a stab flank angle, a crest, and a root. Hydrostatic pressure tests using the 4-round thread form at pressures of 4,500 psi and greater resulted in failures due to thread leaks. Tensile tests using the 4-round thread form at loads of 187,400 lbs. and greater resulted in shearing at forces of 3,535 psi and greater.

5 Claims, 8 Drawing Sheets

(56) References Cited

U.S. PATENT DOCUMENTS

2004/0017079 A1\* 1/2004 Carcagno .............. F16L 15/004
 285/333
2004/0017080 A1\* 1/2004 Carcagno .............. F16L 15/004
 285/333
2004/0108719 A1\* 6/2004 Carcagno .............. F16L 15/004
 285/333

\* cited by examiner

4-ROUND THREAD FORM

BACKGROUND

Technical Field

The subject matter disclosed is generally related to piping thread forms, in particular 4-round thread forms (i.e., four thread per inch pipe forms).

Description of Related Art

Common piping used in oil pipelines generally feature eight (8) thread per inch (TPI) thread forms, also known as 8-round. This thread form is capable of withstanding high pressures and the associated tensile loads as required by American Petroleum Institute (API) standards. However, eight thread per inch thread forms are prone to cross-threading during installation, especially in larger diameter piping.

Additionally, while hundreds of thread forms may exist, many thread forms appropriate for metal piping, such as a buttress thread, cannot be machined into composite pipes due to issues with chipping and cracking. Issues with chipping and cracking are especially present with the sharp angles of the buttress thread. Similarly, premium threads, a class of high-performance thread types commonly used in modern oilwell and gaswell completions, are available in a number of configurations and are typically designed to provide superior hydraulic sealing, improved tensile capacity and ease of make-up. However, due to the machining issues with composite piping, premium threads also cannot be fully implemented into composite piping.

Accordingly, there is need for a thread form that is less prone to cross-threading during installation and capable of being machined into composite piping, yet still capable of withstanding high pressures and tensile loads.

BRIEF DESCRIPTION OF THE DRAWINGS

Many aspects of the disclosure can be better understood with reference to the following drawings, wherein.

DETAIL DESCRIPTION

Reference is now made in detail to the description of non-limiting embodiments as illustrated in the drawings. While the embodiments described may use specific materials or configurations, there is no intent to limit the subject matter to the embodiment or embodiments disclosed herein. Accordingly, various modifications to the embodiments presented may be readily apparent to those skilled in the art, and the generic principles described herein can be applied to other non-limiting embodiments without departing from the spirit or scope of the claimed subject matter. As such, this detailed description of various alternative embodiments should not be construed to limit the scope or breadth of the present apparatus, system and method as set forth in the claims.

Figure 1:
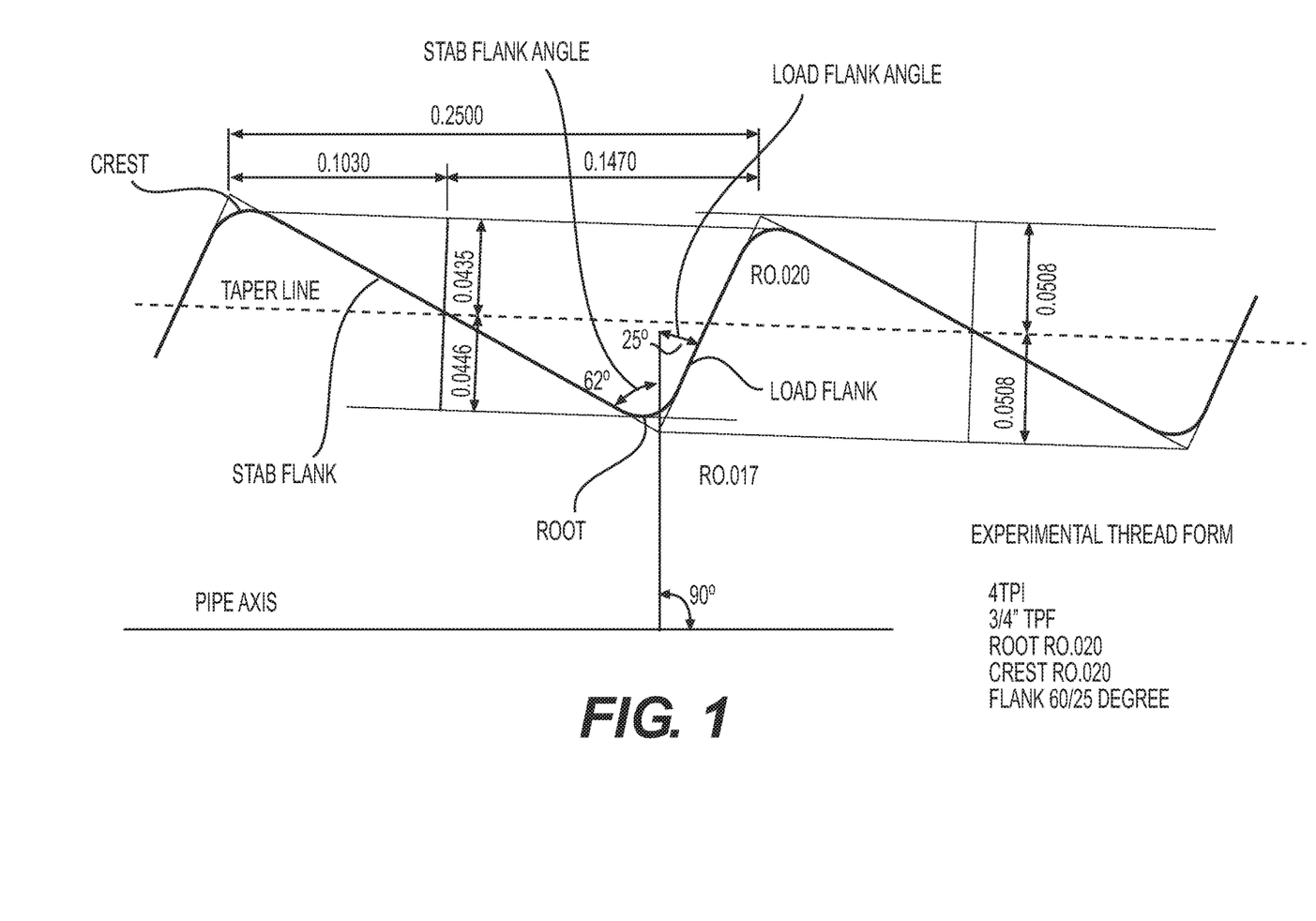
FIG. 1 shows a schematic view of a thread form of the present subject matter.

FIG. 1 shows an exemplary embodiment of a 4-round thread form for piping, comprising a load flank, a stab flank, a crest, and a root. The load flank is sloped at a load flank angle, which is measured from a line that is perpendicular to an axis of the pipe. The stab flank is sloped at a stab flank angle, which is also measured from the line perpendicular from the axis of the pipe, but in the opposite direction. In the exemplary embodiment shown in FIG. 1, the load flank angle is 62 degrees and the stab flank angle is 25 degrees, however the stab flank angle can be any angle between 15 and 25 degrees. Accordingly, in the exemplary embodiment shown, an angle between the load flank and the stab flank can range from 77 to 87 degrees. Additionally, the thread form shown in FIG. 1 includes a ¾" taper per foot (TPF). Furthermore, in the exemplary embodiment shown, the crest portion is configured to have a radius of 0.020 inches and the root portion is configured to have a radius of 0.017 inches.

The embodiment shown in FIG. 1 is exemplary and intended to show the 4-round thread form. Of course, in application, the thread form is applied to both the external (male) threaded portion and internal (female) threaded portions, which would be configured to form a complete threaded connection between two pipes. Additionally, the exemplary 4-round thread form can be implemented on both large and small diameter piping.

Tensile test results of 4-round thread form samples, in accordance with the 4-round thread form of FIG. 1, show that the 4-round thread form can withstand more than twice the tensile load of the conventional 8-round thread form. The strength of a thread form is measured by determining what tensile force is necessary to shear the engaged thread on a per-square-inch of engaged area basis. The conventional 8-round thread forms typically fail at around 1,600 psi during tensile tests. If the test sample is under pressure and the tensile load is a result of end thrust, then the result improves to about 2,000 psi prior to shearing. The first 4-round thread form sample failed at 3,800 psi in a straight pull test without pressure. In two additional tests, the 4-round thread form failed at 3,700 and 3,900 psi.

Additionally, pressure testing of two samples of the 4-round thread also showed excellent results. The first 4-round thread form sample was left at 2,500 psi for a night and a day, and no leaks were present. The second 4-round thread sample form was burst tested, and failed the test head at 3700 psi. A more complete description of the test setup and test results is presented below.

Hydrostatic Test

Figure 2:
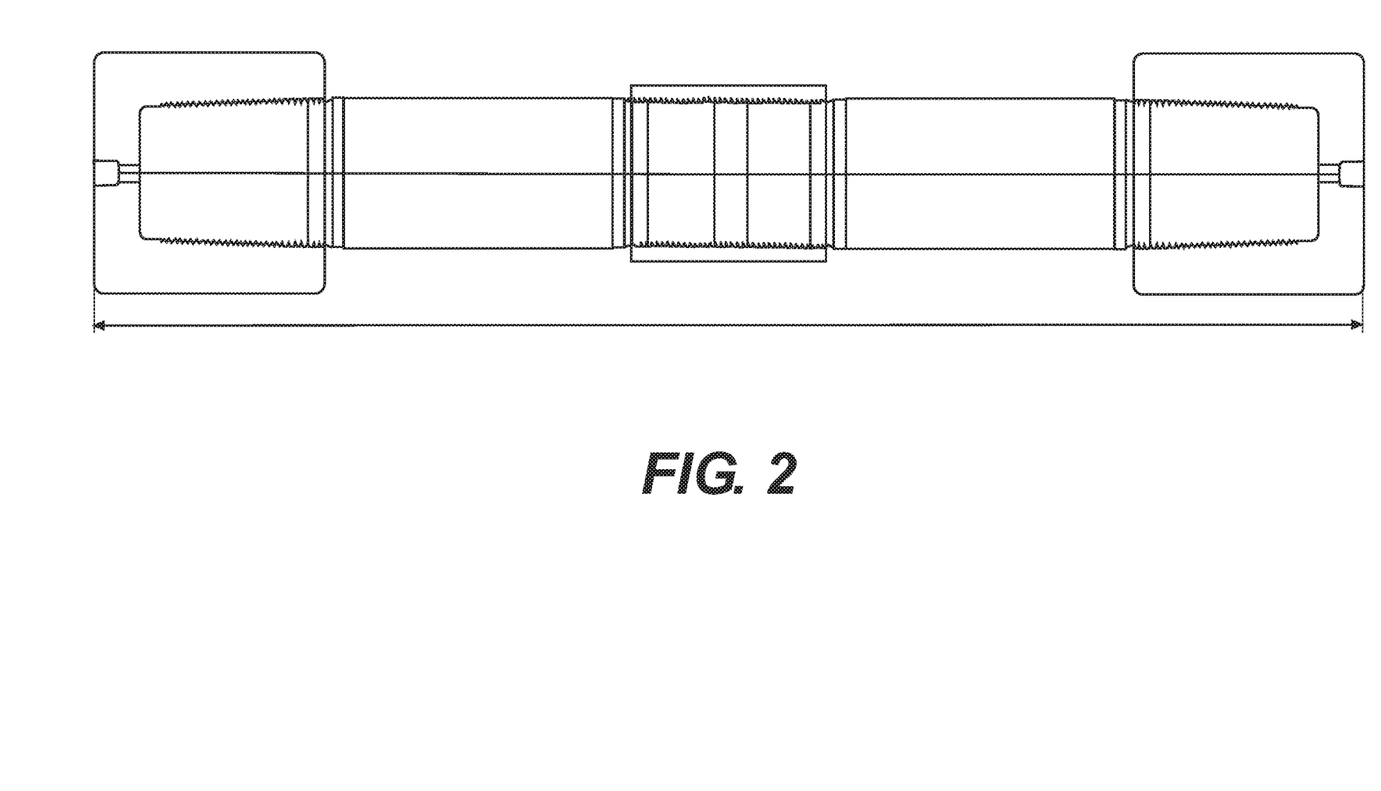
FIG. 2 shows burst test set up for hydrostatic testing.

Shown in FIG. 2 is a burst test set up, for hydrostatic pressure tests of specimens for 6⅝" Yellow Box assembly using the 4-round thread form described above with respect to FIG. 1 and with 4 TPI (threads per inch) ¾" TPF (taper per foot). For convenience, (60/25) indicates a 4-round thread form having a 60 (62) degree load flank angle and a 25 degree stab flank angle.

The test assembly as shown in FIG. 2 includes the following: a steel end cap (6.5" L4 long 60/25 box end), a nipple (6.5" L4 60/25 pin end×4.0" L4 60/25 pin end), a coupler (4.0" L4 60/25 box end×4.0" L4 60/25 box end), a nipple (4.0" L4 60/25 pin end×6.5" L4 60/25 pin end), and steel end cap (6.5" L4 60/25 box end).

Assembly and testing of the 4-round thread form specimens was conducted as follows. The threads on both the box (internal threads/female) and pin (external threads/male) were cleaned of any foreign matter using a clean cloth and a soft brush. Teflon tape was applied on the pin threads. The Teflon tape was rolled tight around the pin end in a clockwise direction starting from the vanish point of the larger body end of the 4-round thread form, proceeding to the last thread on the pin, and returning to the vanish point. During application of the Teflon tape, it was attempted to fully cover each thread of the 4-round thread form on each revolution. Thread compound type TF-15 (manufacturer: Jet-Lube Inc.) was then applied the threads of the box (internal threads) and pin (external threads). The threaded joint was then assembled by hand until "hand-tight". A power tong was then used to complete the assembly using an approximate torque value of 2,700 lb-ft.

The hydrostatic test was conducted to measure the maximum hydrostatic pressure for the 4-round thread form. Initially, the test sample was pressured from 0 to 2000 psi without stopping. The test sample was then pressured, in 500 psi increments in 5 to 10 minute intervals, up to a pressure of 4000 psi. The pressure was then increased in 250 psi increments in 5 minute intervals. This procedure was repeated until failure. All failures were due to thread leaks. The results of the hydrostatic tests are shown Table-1

TABLE 1

| | | | Test Results | | |
|---|---|---|---|---|---|
| Specimen No. | Thread Compound | Coupling OD (inches)/L4 | Type of test | Test Step Duration (minutes) | Failure pressure (psi) | Type of failure |
| 1 | Tape & Black | 8.310/4 | Burst | 10 | 4,500 | Leaks on the fiberglass to steel connection |
| 2 | Tape & Black | 8.310/4 | Burst | 10 | 4,750 | Leaks at fiberglass to steel connection |
| 3 | Tape & Black | 10.050/4.5 | Burst | 10/5 | 5,250 | Leaks on fiberglass to fiberglass connection |
| 4 | Grey | 10.050/4.5 | Burst | 10/5 | 5,250 | Leaks on fiberglass to steel connection |
| 5 | 5.425 | 10.050/4.5 | Burst | 10/5 | 5,750 | Leaks on the fiberglass to steel connection |

Tensile Test

Figure 3:
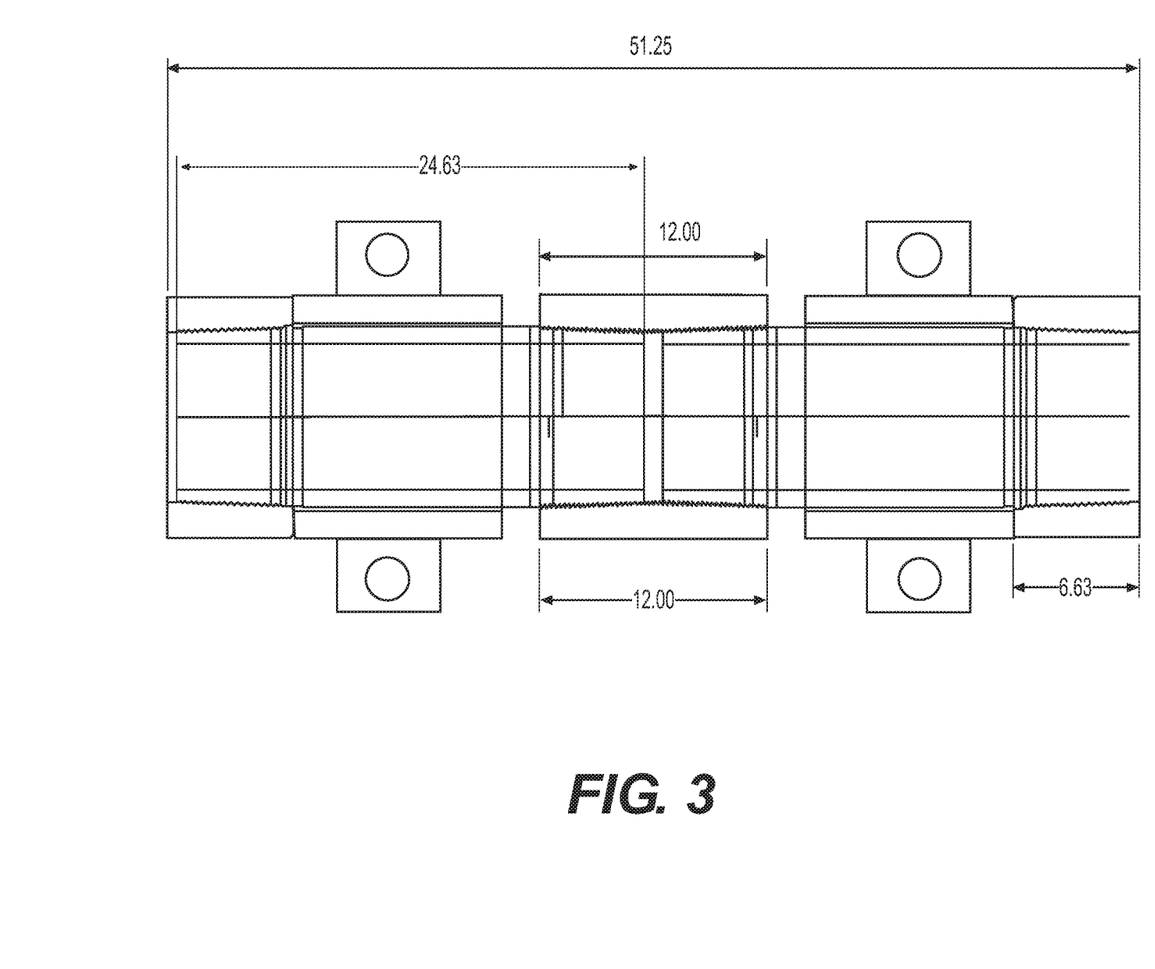
FIG. 3 shows a spool assembly for tensile testing.

Shown in FIG. 3 a spool assembly for tensile testing of seven (7) specimens for 9⅝" Yellow Box assembly using the 4-round thread form (60/25) and (60/15) with 4 TPI ¾" TPF. For convenience, (60/25) indicates a 4-round thread form having a stab flank angle of 60 degrees and a load flank angle of 25 degrees, (60/15) indicates a 4-round thread form having a stab flank angle of 60 degrees and a load flank angle of 15 degrees.

Assembly and testing of the 4-round thread form specimens was conducted as follows. The threads on both the pin (external threads/male) and the box ends (internal thread/female) were cleaned of any foreign matter using a clean cloth and a soft brush. Teflon tape was then applied on the pin threads. Tape was rolled tight around the pin end in a clockwise direction starting from the vanish point of the larger body end of the thread, proceeding to the last thread on the pin, and returning to the vanish point. During application of the Teflon tape, it was attempted to fully cover each thread of the 4-round thread form on each revolution. Then thread compound type TF-15 (manufacturer: Jet-Lube Inc.) was applied on threads of box and pin.

The joint was then assembled by hand until "hand-tight". A power tong was then used to complete the assembly using an approximate torque value of 2,700 lb-ft. See FIGS. 4A-B.

Figure 4A:
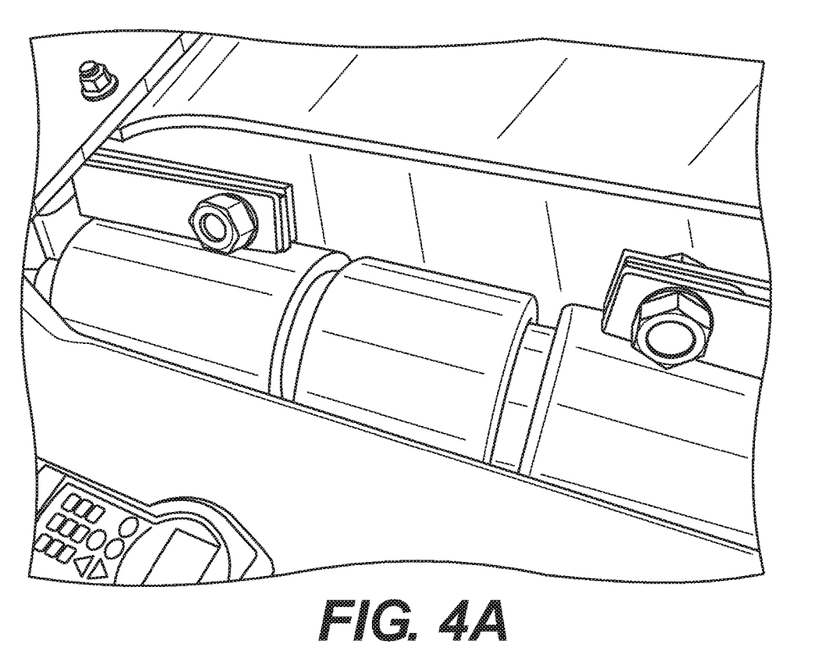
FIGS. 4A-B show a tensile pull test assembly.
Figure 4B:
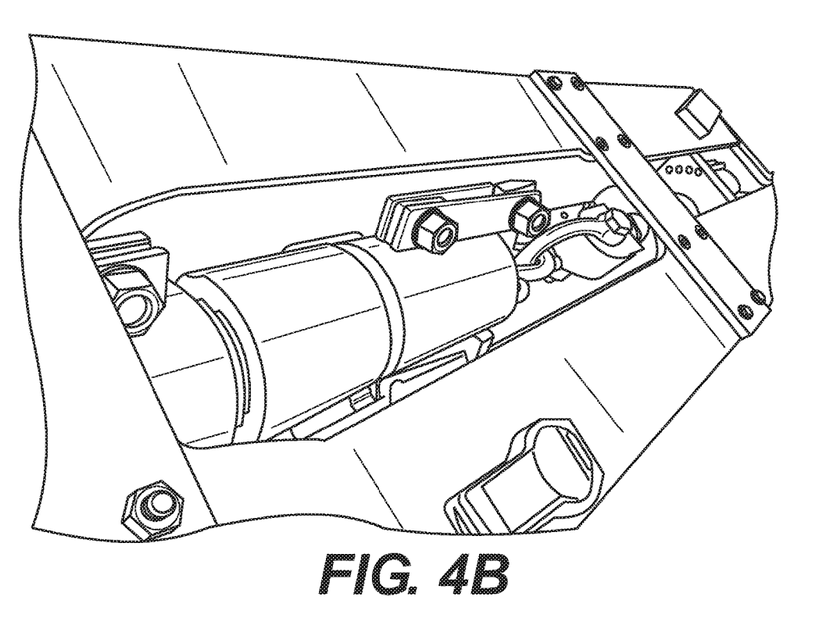
Figure 5A:
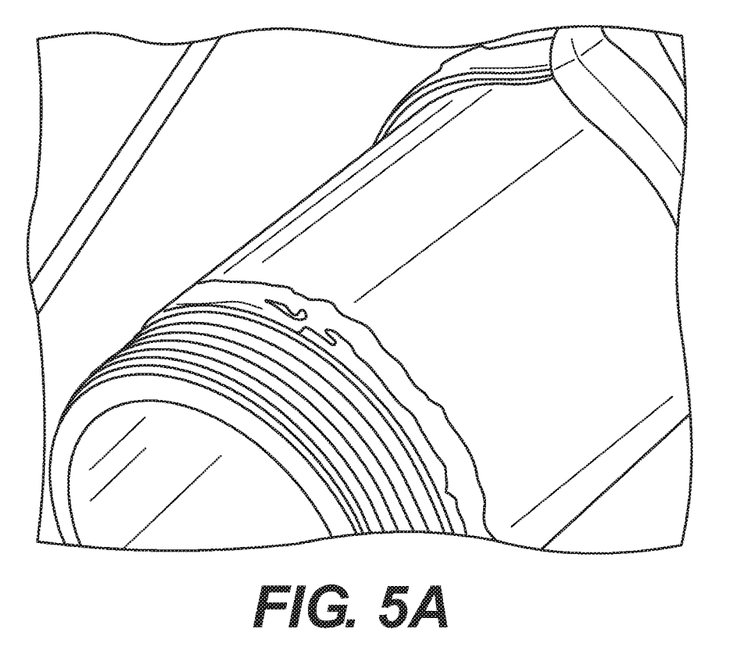
FIGS. 5A-D show tensile test specimen.
Figure 5B:
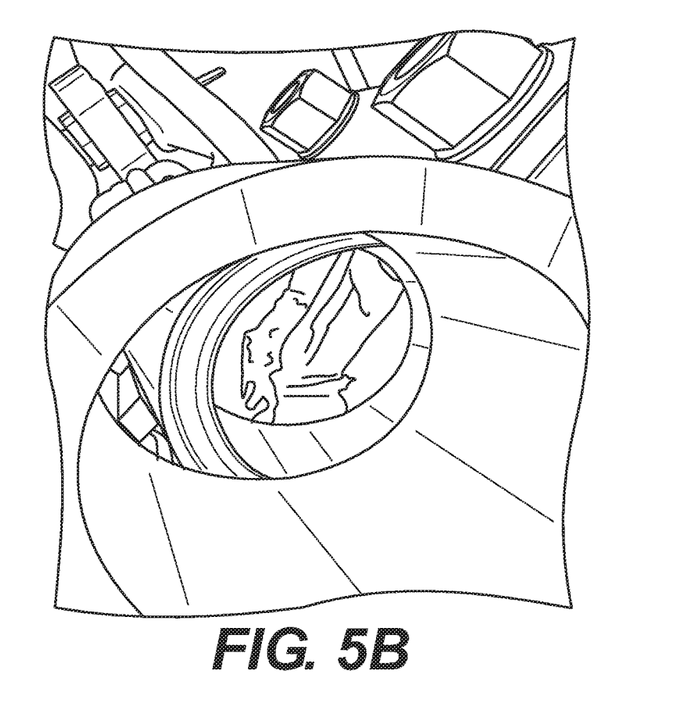
Figure 5C:
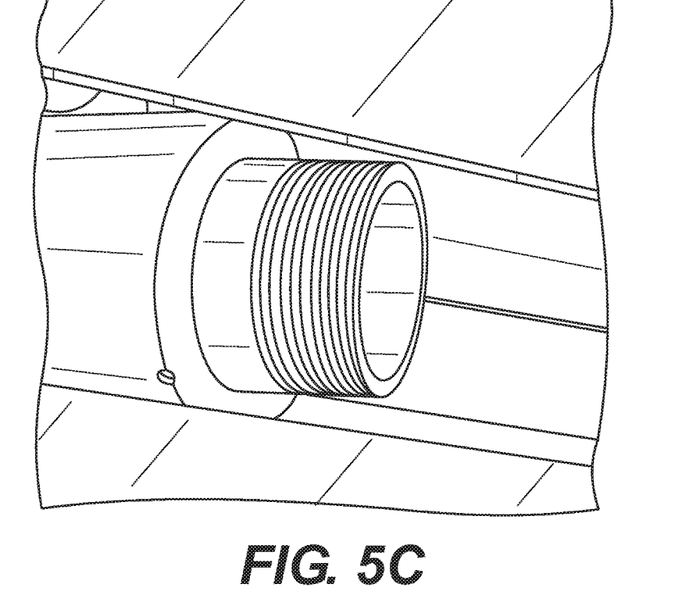
Figure 5D:
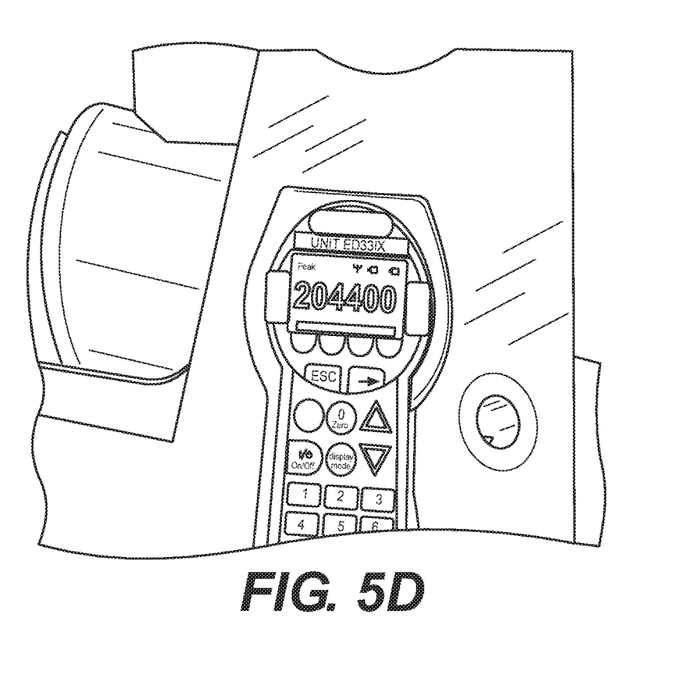

The tensile load test was executed to verify the tensile strength for the 4-round thread form. In the tensile load test, steel fixtures were used to pull the assembly shown in FIG. 2. A total of 6 samples were pulled for during tensile load testing. The assembly mounted on the tensile tester is shown in FIGS. 4A-B.

Extensive experience with standard American Petroleum Institute (API) 8-round threaded connections verifies that the thread shear anticipated on a straight pull tensile test will be around 1,600 psi. In other words, each square inch of engaged thread will typically withstand a shear load of around 1,600 psi. The shear force values indicated below in Table-2 indicate the ultimate shear strength per square inch of engaged thread of the 4-round thread form.

The initial test piece was assembled as shown in FIG. 3, including the following: a half coupling with 8 round thread, L4=6.5"; a nipple threaded on one end with conventional 8-round thread form, L4=6.5", and on the other end threaded with 4-round thread form, L4=5.5"; a coupler threaded both ends with 4-round thread form, L4=5.5"; a nipple threaded on one end with 4-round thread form, L4=5.5", and the other end threaded with conventional 8-round thread form L4=6.5"; and a half coupling with conventional 8-round thread form, L4=6.5". An electronic crane scale with a 300,000 lb capacity was used to measure the tensile force on each pull. A 15" hydraulic cylinder mounted in the test frame provided the tensile force for each pull.

The first pull, which is not recorded here, sheared the conventional 8-round thread form connection, despite it being one inch shorter in thread length. A second sample was prepared wherein L4 on the 4-round thread form was reduced to 3.5". Again the conventional 8-round thread failed. Finally specimen 1, which is recorded below, was prepared with an L4 of 2.5". The M dimension is 0.713, thus leaving an effective engaged thread length of 1.787". Six such samples, three of the 60/25 4-round thread form and three of the 60/15 4-round thread form were tested and recorded below.

TABLE 2

| 9⅝" RB sample | Thread type | Nominal ID (inches) | Tensile Load (lbs) | Effective thread Length ($L_2$ inches) | Shear stress (psi) | Failure type |
|---|---|---|---|---|---|---|
| Specimen # 1 | 60/25 | 7.840 | 204,000 | 1.787 | 3,849 | Sheared off |
| Specimen # 2 | 60/25 | 7.840 | 204,000 | 1.787 | 3,849 | Sheared off |
| Specimen # 3 | 60/25 | 7.840 | 199,200 | 1.787 | 3,758 | Sheared off |
| Thread 60/25 average result | | | | | 3,818 | |

TABLE 2-continued

| 9⅝" RB sample | Thread type | Nominal ID (inches) | Tensile Load (lbs) | Effective thread Length ($L_2$ inches) | Shear stress (psi) | Failure type |
|---|---|---|---|---|---|---|
| Specimen # 4 | 60/15 | 7.840 | 208,400 | 1.787 | 3,932 | Sheared off |
| Specimen # 5 | 60/15 | 7.840 | 187,400 | 1.787 | 3,535 | Sheared off |
| Specimen # 6 | 60/15 | 7.840 | 206,400 | 1.787 | 3,894 | Sheared off |
| Thread 60/15 average result | | | | | 3,787 | |

As can be seen by the results above in Table-2, the average value of shear strength for the 4-round thread form is 2.2 to 2.4 times that of the conventional 8-round thread form. During testing, shear failure occurred at the fiberglass (Nipple) to fiberglass (Coupler) connection, see FIGS. 5A-D, however the sample body was not damaged in any of the six tests.

Figure 6A:
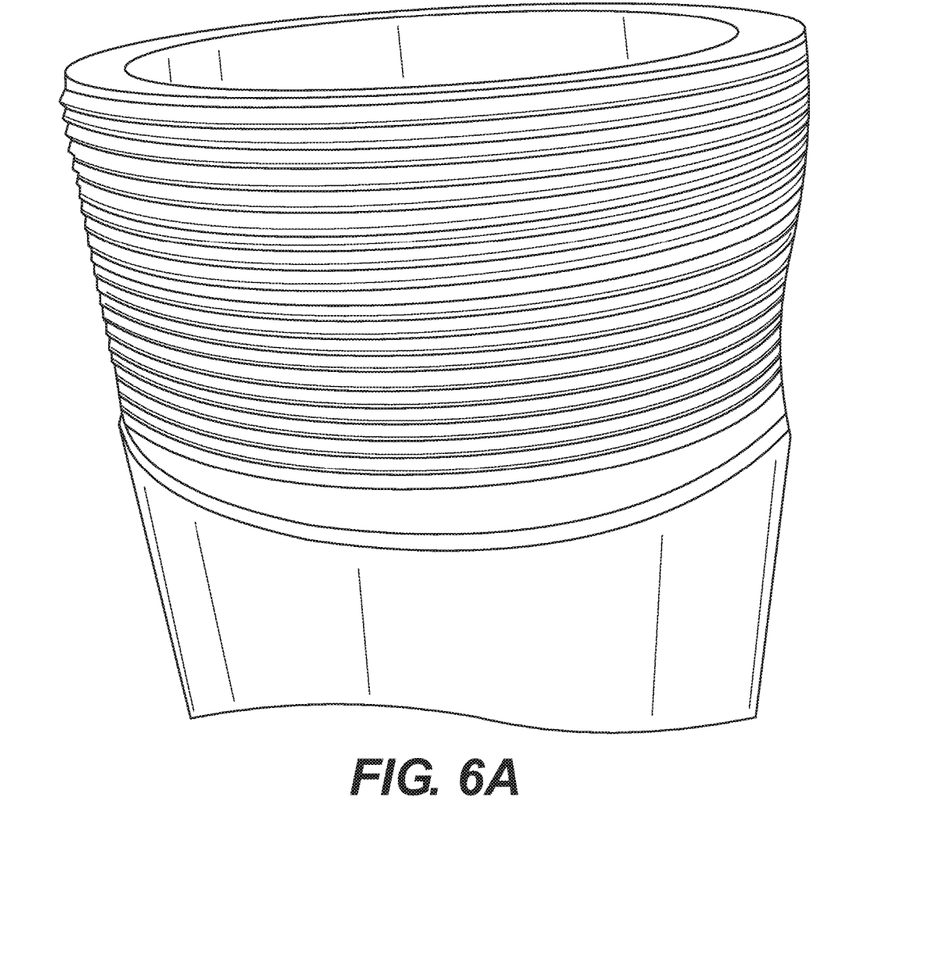
FIGS. 6A-B show a make and break test specimen.
Figure 6B:
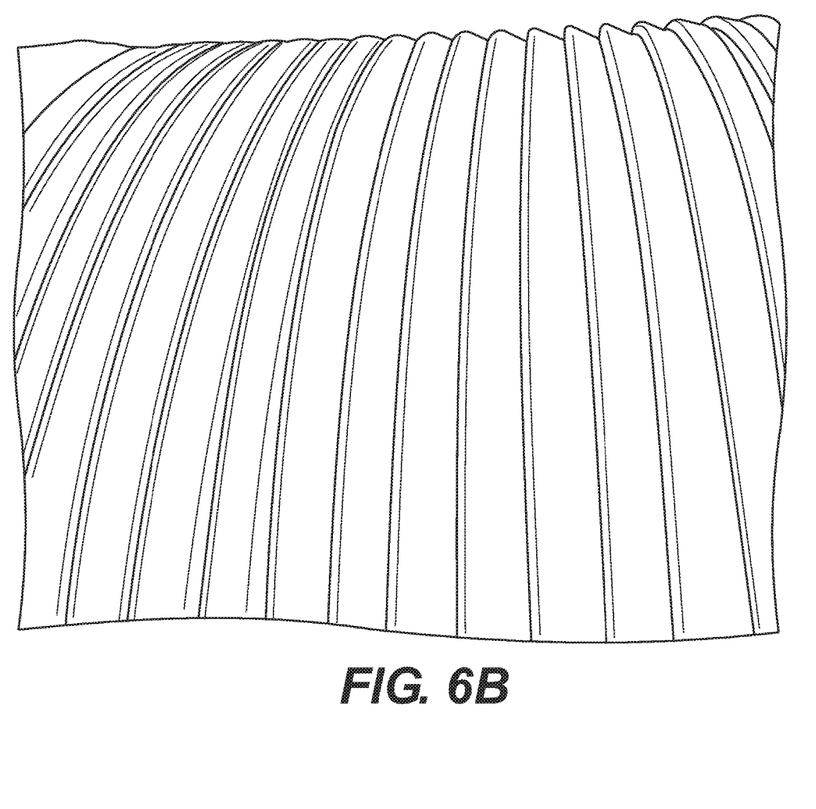

In order to establish the capacity of the 4-round thread form to be repetitively made up and broken out, an 8 inch nipple and coupling threaded with a 9⅝" size thread was torqued up to 2,700 ft lbs and broken out 10 times consecutively. After the 10 such cycles the thread was inspected and found to have suffered no notable galling, cracking, or other damage whatsoever. See FIGS. 6A-B.

The disclosure provided herein fully describes the thread form in such clear and concise terms as to enable those skilled in the art to understand and practice the same, and the generic principles described herein can be applied to other embodiments without departing from the spirit or scope of this disclosure. Thus, it is to be understood that the description and drawings presented herein represent a presently preferred embodiment of the subject matter and are therefore representative of the subject matter which is broadly contemplated by the present disclosure.

The invention claimed is:

1. A thread form for composite pipes comprising:
   four round threads per inch of pipe, the four round threads including;
      a load flank of each of the threads having a load flank angle between 15 and 25 degrees relative to a pipe axis;
      a stab flank of each of the threads having a stab flank angle between 60 and 62 degrees relative to the pipe axis;
      a crest portion between the stab flank and the load flank; and
      a root portion between the load flank and the stab flank, wherein the stab flank angle is between 2.4 and 4.13 times the load flank angle in the root portion.

2. The thread form of claim 1, wherein said crest portion is configured to have a radius of 0.020 inches.

3. The thread form of claim 1, wherein said root portion is configured to have a radius of 0.017 inches.

4. A composite pipe, comprising:
   a first threaded end comprising a thread form having four threads per inch of pipe;
   a load flank of each of the threads having a load flank angle between 15 and 25 degrees relative to a pipe axis;
   a stab flank of each of the threads having a stab flank angle between 60 and 62 degrees relative to the pipe axis;
   a crest portion between the stab flank and the load flank; and
   a root portion between the load flank and the stab flank, wherein the stab flank angle is between 2.4 and 4.13 times the load flank angle in the root portion;
   wherein the first threaded end is on an exterior or an interior of the composite pipe.

5. A threaded coupler for composite pipes, comprising:
   an internal thread form on each end of the coupler, the internal thread form comprising four round threads per inch of pipe having:
      a load flank of each of the threads having a load flank angle between 15 and 25 degrees relative to a pipe axis;
      a stab flank of each of the threads having a stab flank angle between 60 and 62 degrees relative to a pipe axis;
      a crest portion between the stab flank and the load flank; and
      a root portion between the load flank and the stab flank, wherein the stab flank angle is between 2.4 and 4.13 times the load flank angle in the root portion.

* * * * *